Jan. 20, 1959  F. DIEMER  2,870,410
ELECTRIC MEASURING INSTRUMENT
Filed Jan. 19, 1953
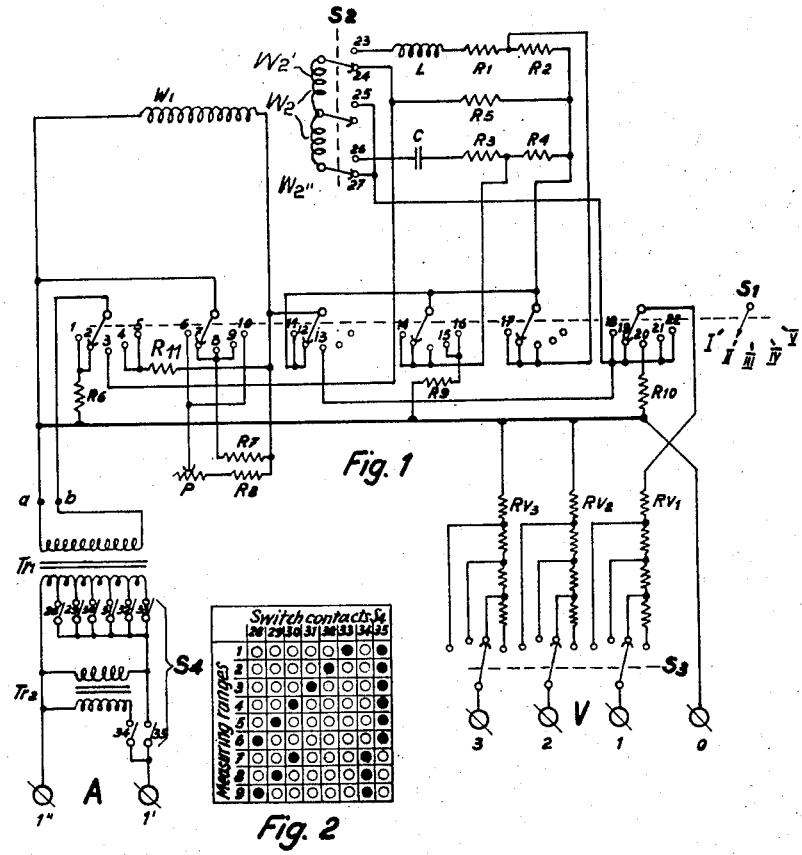
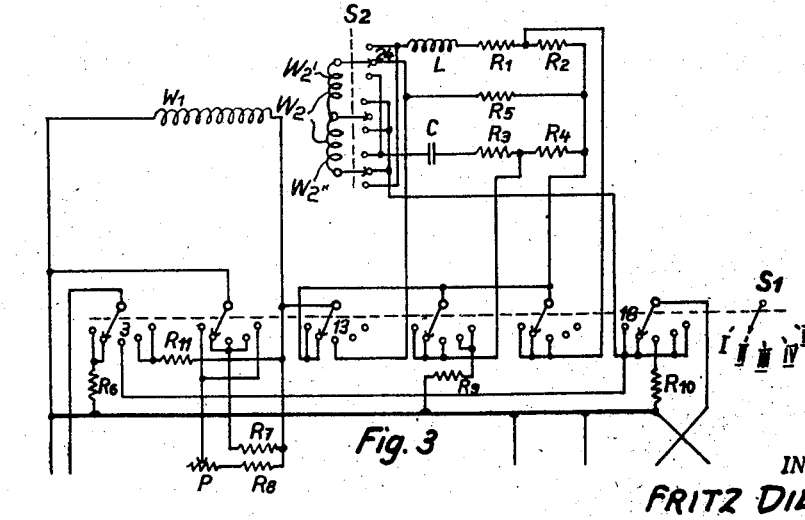
INVENTOR.
FRITZ DIEMER United States Patent Office 2,870,410
Patented Jan. 20, 1959

2,870,410

ELECTRIC MEASURING INSTRUMENT

Fritz Diemer, Meilen, Switzerland, assignor to EMA A.-G., Meilen, Switzerland

Application January 19, 1953, Serial No. 331,841

Claims priority, application Switzerland January 19, 1952

3 Claims. (Cl. 324—141)

The present invention relates to measuring instruments for use in connection with alternating circuits.

Combined electric measuring instruments permitting measuring of voltage, current and effective power to thereby facilitate based on these measured values, calculation of reactive power and power factor are known in the art. Other measuring instruments are known which indicate the voltage, the current and the vector resulting from voltage and current. Such instruments too, permit calculation of the effective and reactive power as well as the power factor from the three possible measures. However, such instruments necessitate conversions, which are very complicated in practice and they may include inaccuracies and errors especially with small phase angles.

It is one of the primary objects of the present invention to provide means affording the construction of an electric measuring instrument which overcomes the aforementioned disadvantages and facilitates direct indications of measures of current, voltage, effective power, reactive power and power factor.

Other advantages and objects of the invention will ensue from the description of the invention and drawing attached thereto, in which:

Fig. 1 illustrates a circuit diagram of a first embodiment of the invention.

Fig. 2 represents diagrammatically the change-over switch for the different measuring ranges, and Fig. 3 shows a diagram of another embodiment of the invention.

The instrument whose circuit is shown in Fig. 1 comprises electrodynamic measuring means or device having a stationary coil $W_1$ and a rotary coil $W_2$ divided into two halves $W_2'$ and $W_2''$ wound in the same sense. Due to a selector switch $S_1$ the device may be switched for use as voltmeter, as ammeter or also as wattmeter. By means of a change-over or commutator switch $S_2$ the rotary coil $W_2$ may be connected to a parallel-resonance circuit L, C, $R_1$, $R_2$, $R_3$ and $R_4$, so that at operation of the switch $S_2$ the rotary coil $W_2$ is traversed from both ends toward the tap defining the junction between the coil sections or halves $W_2'$ and $W_2''$ by two currents the phases of which are shifted in opposite directions. This results in a counteracting of the active current parts and in an addition of the reactive current parts. The dimensions of the elements L, C, $R_1$, $R_2$, $R_3$ and $R_4$ are such, that for the resonance frequency of the L—C circuit the ampere-turns of the active components of the rotary coil currents are just neutralized while the ampere-turns of the added reactive components are equal to those produced by the instrument current when the switch $S_2$ is not depressed. At positions IV—V of the selector switch the impedance of the parallel-resonance circuit remains ohmic for heavy deviations of the frequency from the nominal value and is equal to $R_5$. At position I—III of the selector switch $S_1$, $R_2$ and $R_4$ are short-circuited so that the amplitude of the added reactive components is substantially greater than at positions IV—V.

At positions II, III and IV of the selector switch $S_1$ the stationary coil is shunted by a stationary resistance $R_7$ in such a way that the aforesaid device has a predetermined sensitivity.

At positions I and V, $R_7$ is replaced by the variable resistor P by means of which the sensitivity of the device may be continuously varied.

The switch $S_3$ serves to select the voltage measuring ranges. The series resistances $Rv_2$ and $Rv_3$ in connection with $Rv_1$ serve only to produce an artificial neutral point when the instrument is connected to a three-phase line or main without a neutral wire.

The current transformer $Tr_1$ is so dimensioned that when the rated current flows in the primary, there flows in the secondary an instrument current which is equal to the one produced by the series resistance $Rv_1$ at its rated voltage. The second current transformer $Tr_2$ has a transformation ratio of 10:1 and permits a corresponding extension of the current measuring ranges. Fig. 2 represents the position of the switch contacts 28—35 of the changeover switch $S_4$ for nine different measuring ranges. This cascade connection of two current transformers permits the inclusion of high current measuring ranges with change-over switches for a relatively small power capacity.

By means of the measuring instrument according to Fig. 1 various measures may be executed as follows:

*Measuring of voltage*

The selector switch $S_1$ assumes position II. For alternating current the voltage is connected to the terminals 0—1 or for three-phase current to terminals 1—2—3. The circuit is closed as follows: terminal 1—$Rv_1$—switch contact $S_1/19$—switch contact $S_2/27$—rotary coil $W_2$—switch contact $S_2/24$—$R_5$—switch contact $S_1/12$—stationary coil $W_1$—terminal 0. The current transformer $Tr_1$ is not connected to the device. It is secondarily loaded by a resistor $R_6$, which represents the compensation resistance for the device.

*Measuring of current*

The selector switch $S_1$ assumes position III. The voltage circuit is cut off from the device. $Rv_1$ is connected over switch contact $S_1/20$ and over $R_{10}$ to the neutral point. $R_{10}$ forms the compensation resistance for the movement. The secondary circuit of the transformer $Tr_1$ is closed as follows: $Tr_1/a$—$W_1$—switch contact $S_1/13$—switch contact $S_2/27$—$W_2$—switch contact $S_2/24$—switch contact $S_1/3$—$Tr_1/b$.

*Measuring of effective power*

The selector switch $S_1$ is moved to position IV. The voltage circuit is closed as follows: Terminal 1—$Rv_1$—switch contact $S_1/21$—switch contact $S_2/27$—$W_2$—switch contact $S_2/24$—$R_5$—switch contact $S_1/15$—$R_9$—terminal O. $R_9$ forms the compensation resistance for the stationary coil $W_1$.

The current circuit is closed as follows: $Tr_1/a$—$W_1$—$R_{11}$—switch contact $S_1/4$—$Tr_1/b$. $R_{11}$ forms the compensation resistance for the rotary coil $W_2$.

*Measuring of the reactive power*

The selector switch $S_1$ remains in position IV. The switch $S_2$ is actuated. The current circuit remains unchanged. The voltage circuit closes as follows: Terminal 1—$Rv_1$—switch contact $S_1/21$—switch contact $S_2/25$—

$W_2'$—switch contact $S_2/23$—L—$R_1$—$R_2$
$W_2''$—switch contact $S_2/26$—C—$R_3$—$R_4$ —switch contact $S_1/15$—$R_9$—O.

In this arrangement due to the rotary coil $W_2$ there is a phase quadrature of the current with respect to the applied voltage. The absolute value of the ampere-turns in the rotary coil remains unchanged.

*Measuring of the power factor*

The selector switch $S_1$ assumes position V. In this position the fixed resistor $R_7$ which previously shunted the stationary coil $W_1$ is disconnected and the coil shunted by a fixed resistor $R_8$ in series with the variable resistance P. During measurement of the effective or active power, therefore, the possible deflection of the indicator needle (not shown) of the instrument may be brought to a predetermined value by suitably regulating the sensitivity of the instrument with the aid of the variable resistor P. When the change-over switch $S_2$ is now pressed to that one of its positions in which the instrument is adapted for measuring reactive power, the deflection of the indicator needle becomes a direct measure of the power factor. As known the latter is given by the relation $$\tan \varphi = \frac{\text{reactive power}}{\text{effective power}}$$

As the effective power, i. e. the denominator, may be held constant, the regulated measurement of the reactive power, i. e. the numerator, affords a direct indication of $\tan \varphi$. The dial (not shown) of the instrument can thus be calibrated in terms of $\tan \varphi$, or $\varphi$ itself, or $\cos \varphi$, the latter being the ratio of the total power in the circuit to the total equivalent volt-amperes in that circuit.

*Measuring of frequency*

The selector switch $S_1$ assumes position I. This position differs from position II "measuring of voltage" only in that the sensitivity of the instrument is regulated by the variable resistor P as in the case of the measurement of the power factor.

In the case of measuring voltage the indication may thus also be brought onto a predetermined value or mark. If afterwards the change-over switch $S_2$ is pressed or operated there is a phase quadrature at the resonance frequency between the rotary coil current through $W_2$ and the current through the stationary coil $W_1$. The needle indication remains at zero when the change-over switch $S_2$ is depressed. If the mains frequency differs from the resonance frequency the active currents do not balance each other out and the difference between them gives a new needle deflection which is a direct indication or measure of the frequency deviation. Since in the position I of the selector switch the resistances $R_2$ and $R_4$ are short-circuited over contacts $S_1/14$ and $S_1/17$ the current in the parallel-resonance circuit $W_2$—L—$R_1$—$R_3$—C is increased with respect to the current when key $S_2$ is not depressed. Thereby relatively small deviations of frequency may provoke substantial needle indications.

In the instrument according to Fig. 1 the zero indication is situated in the middle of the scale or dial (not shown). If voltage is measured the needle or indicator goes to the right hand side, while if current is measured the needle goes to the left-hand side. For positive effective power and for reactive power due to capacitive load, the needle goes to the right, while for negative effective power and for reactive power due to inductive load it goes to the left. For the power factor $\cos \varphi$ for capacitive load, the needle goes to the right, while for the power factor $\cos \varphi$ for inductive load the needle goes to the left. Finally, for measuring mains frequencies in the range of 40–50–50 C. P. S., the needle goes from the left-hand end of the scale past the middle and to the right-hand end of the scale.

Fig. 3 represents a diagram of a measuring instrument having the zero point at the left end of the scale. Measuring of voltage, current and positive effective power needle indication occurs to the right. In order to enable the needle to deviate to the same side of the dial or scale both for voltage and current measurements, Fig. 3 shows the contact $S_2/24$ connected to $S_1/13$ instead of $S_1/3$ and contact $S_1/18$ connected to contact $S_1/3$ instead of $S_1/13$. Needle indication to the right is always possible for measurement of reactive power, power factor and frequency as the change-over switch $S_2$ is also used as current reverser. The position of this current reverser indicates the sign of the corresponding measurement, i. e. if inductive or capacitive reactive power or power factor or if a frequency 40–50 C. P. S. or 50–60 C. P. S. is indicated.

Having thus described the invention, what is claimed as new and desired to be secured by Letters Patent, is:

1. An electrical A. C. measuring instrument, comprising a meter system including a stationary coil and a rotary coil, an electric oscillating circuit connected to said rotary coil and provided with inductive and capacitive reactances and having first and second connection means, a current circuit for said metering system, said current circuit including a variable resistor for continuously regulating the sensitivity of said metering system, a selector switch provided with at least four contact positions and respective sets of contacts, said current circuit and said stationary coil and said rotary coil being interconnected through one of the said sets of contacts when said selector switch is in a selected position, said current circuit being connected with said first connection means and said second connection means of said oscillating circuit through a second of said sets of contacts when said selector switch is in a selected position, said variable resistor being connected to said current circuit through at least one of said sets of contacts, and a change-over switch operable in one of its positions to disconnect said second connection means of said oscillating circuit from said rotary coil while simultaneously connecting said second connection means directly to said selector switch and therethrough to said current circuit, said change-over switch being operable in another of its positions to connect said second connection means of said oscillating circuit to said rotary coil, said change-over switch in said one position thereof disconnecting said second connection means of said oscillating circuit from said rotary coil, movement of said selector switch to a first position thereof disconnecting said variable resistor from said current circuit for voltage measurements and indications, movement of said selector switch to a second position thereof disconnecting said variable resistor from said current circuit for current measurements and indications, movement of said selector switch to a third position thereof disconnecting said variable resistor from said current circuit for effective power measurements and indications and while when said change-over switch is in said other position thereof connecting said second connection means of said oscillating circuit to said rotary coil, movement of said selector switch to said third position thereof permitting the phase of current in said rotary coil at the resonance frequency of said oscillating circuit to be shifted by 90° for reactive power measurements and indications, movement of said selector switch to a fourth position thereof connecting said variable resistor to said current circuit and to said coils and with said change-over switch in said one position thereof permitting effective power indication and concurrent continuous regulation of said meter system to bring the last-named indication thereof to a predetermined fixed value, and subsequent movement of said change-over switch to said other position thereof with said selector switch remaining at said fourth position thereof permitting an associated reactive power indication which constitutes a direct measure of power factor.

2. An electrical A. C. measuring instrument, comprising a meter system including a stationary coil and a rotary coil, an electric oscillating circuit connected to said rotary coil and provided with inductive and capacitive reactances and having first and second connection means, a current circuit for said metering system, said current circuit including a variable resistor for continuously regulating the sensitivity of said metering system, a selector switch provided with at least four contact positions and respective sets of contacts, said current circuit and said stationary coil and said rotary coil being interconnected through one of the said sets of contacts when said selector switch is in a selected position, said current circuit being connected with said first connection means and said second connection means of said oscillating circuit through a second of said sets of contacts when said selector switch is in a selected position, said variable resistor being connected to said current circuit through at least one of said sets of contacts, and a change-over switch operable in one of its positions to disconnect said second connection means of said oscillating circuit from said rotary coil while simultaneously connecting said second connection means directly to said selector switch and therethrough to said current circuit, said change-over switch being operable in another of its positions to connect said second connection means of said oscillating circuit to said rotary coil, said change-over switch in said one position thereof disconnecting said second connection means of said oscillating circuit from said rotary coil, movement of said selector switch to a first position thereof disconnecting said variable resistor from said current circuit for voltage measurements and indications, movement of said selector switch to a second position thereof disconnecting said variable resistor from said current circuit for current measurements and indications, movement of said selector switch to a third position thereof disconnecting said variable resistor from said current circuit for effective power measurements and indications and while when said changeover switch is in said other position thereof connecting said second connection means of said oscillating circuit to said rotary coil, movement of said selector switch to said third position thereof permitting the phase of current in said rotary coil at the resonance frequency of said oscillating circuit to be shifted by 90° for reactive power measurements and indications, movement of said selector switch to a fourth position thereof connecting said variable resistor to said current circuit and to said coils and with said change-over switch in said one position thereof permitting effective power indication and concurrent continuous regulation of said meter system to bring the last-named indication thereof to a predetermined fixed value, and subsequent movement of said change-over switch to said other position thereof with said selector switch remaining at said fourth position thereof permitting an associated reactive power indication which constitutes a direct measure of power factor, said selector switch being further provided with a fifth contact position, said selector switch when in said fifth position connecting said variable resistor to said current circuit and said stationary coil and said rotary coil with said oscillating circuit being connected to said rotary coil but otherwise affording the same connections as in said second position to adapt said meter system for frequency measurements and indications, whereby with said selector switch in said fifth position thereof and said change-over switch in said one position thereof, the indication of said meter system may be brought to a predetermined fixed value by operation of said variable resistor, subsequent movement of said change-over switch to said other position thereof without any concurrent movement of said selector switch effecting at the resonance frequency of said oscillating circuit a phase quadrature between the currents flowing in said rotary and stationary coils, respectively, the resulting indication being a direct measure of the difference between said resonance frequency and the frequency being measured.

3. An electrical A. C. measuring instrument, comprising a meter system including a stationary coil and a rotary coil, an electric oscillating circuit connected to said rotary coil and provided with inductive and capacitive reactances and having first and second connection means, a current circuit for said metering system, said current circuit including a variable resistor for continuously regulating the sensitivity of said metering system, a selector switch provided with at least four contact positions and respective sets of contacts, said current circuit and said stationary coil and said rotary coil being interconnected through one of the said sets of contacts when said selector switch is in a selected position, said current circuit being connected with said first connection means and said second connection means of said oscillating circuit through a second of said sets of contacts when said selector switch is in a selected position, said variable resistor being connected to said current circuit through at least one of said sets of contacts, and a change-over switch operable in one of its positions to disconnect said second connection means of said oscillating circuit from said rotary coil while simultaneously connecting said second connection means directly to said selector switch and therethrough to said current circuit, said change-over switch being operable in another of its positions to connect said second connection means of said oscillating circuit to said rotary coil, said change-over switch in said one position thereof disconnecting said second connection means of said oscillating circuit from said rotary coil, movement of said selector switch to a first position thereof disconnecting said variable resistor from said current circuit for voltage measurements and indications, movement of said selector switch to a second position thereof disconnecting said variable resistor from said current circuit for current measurements and indications, movement of said selector switch to a third position thereof disconnecting said variable resistor from said current circuit for effective power measurements and indications and while when said change-over switch is in said other position thereof connecting said second connection means of said oscillating circuit to said rotary coil, movement of said selector switch to said third position thereof permitting the phase of current in said rotary coil at the resonance frequency of said oscillating circuit to be shifted by 90° for reactive power measurements and indications, movement of said selector switch to a fourth position thereof connecting said variable resistor to said current circuit and to said coils and with said change-over switch in said one position thereof permitting effective power indication and concurrent continuous regulation of said meter system to bring the last-named indication thereof to a predetermined fixed value, and subsequent movement of said change-over switch to said other position thereof with said selector switch remaining at said fourth position thereof permitting an associated reactive power indication which constitutes a direct measure of power factor, said selector switch being further provided with a fifth contact position, said selector switch when in said fifth position connecting said variable resistor to said current circuit and said stationary coil and said rotary coil with said oscillating circuit being connected to said rotary coil but otherwise affording the same connections as in said second position to adapt said meter system for frequency measurements and indications, whereby with said selector switch in said fifth position thereof and said change-over switch in said one position thereof, the indication of said meter system may be brought to a predetermined fixed value by operation of said variable resistor, subsequent movement of said change-over switch to said other position thereof without any concurrent movement of said selector switch effecting at the resonance frequency of said oscillating circuit a phase quadrature between the currents flowing in said rotary and stationary coils, respectively, the resulting indication being a direct measure of the difference between said resonance frequency and the frequency being measured, said meter system being provided with a pointer operable by said rotary coil and with a scale associated with said pointer and having a central null index mark and additional index marks disposed in ascending order on both sides of said null index mark, the respective values of said coils and of the components of said oscillating and current circuits being predetermined to ensure location of said pointer opposite the center of said scale when no reading is being taken, as well as deflection of said pointer to either side of said central null index mark in dependence on the type of measurement being performed.

References Cited in the file of this patent

UNITED STATES PATENTS

| | | |
|---|---|---|
| 1,959,592 | Macadie | May 22, 1934 |
| 2,079,472 | Varley | May 4, 1937 |
| 2,300,958 | Oman | Nov. 3, 1942 |